United States Patent [19]

Sugimori

[11] 3,860,197
[45] Jan. 14, 1975

[54] MOTOR-DRIVEN FILM REWIND DEVICE FOR A CAMERA

[75] Inventor: Shiro Sugimori, Tokyo, Japan

[73] Assignee: Nippon Kogaku K.K., Tokyo, Japan

[22] Filed: July 24, 1972

[21] Appl. No.: 274,649

[30] Foreign Application Priority Data
Aug. 9, 1971 Japan.............................. 46-60074

[52] U.S. Cl................... 242/201, 242/205, 352/166
[51] Int. Cl. ......................... B11b 15/32, G03b 1/04
[58] Field of Search ........................... 242/201–205; 352/166, 177–179

[56] References Cited
UNITED STATES PATENTS
2,858,996   11/1958   Switzer .............................. 242/202
3,016,209   1/1962    Higonnet et al. ................... 242/202
3,659,805   5/1972    Umeda.............................. 242/201

*Primary Examiner*—Leonard D. Christian
*Attorney, Agent, or Firm*—Fitzpatrick, Cella, Harper & Scinto

[57] ABSTRACT

A motor-driven film rewind device for a camera comprises a camera body adapted to receive a supply spool, and a motor drive system for attachment to the bottom of the camera body. The motor drive system includes a motor, a circuit for driving the motor including a siwtch for opening and closing the circuit, and a rotary shaft slidable axially thereof between a first and second position. Coupling means provided at one end of the rotary shaft are engageable with the supply spool upon attachment of the motor drive system to the camera body and in the second position of the rotary shaft. In response to the sliding movement of the rotary shaft, the switch in the circuit is opened and closed in the first and second positions of the rotary shaft, respectively.

4 Claims, 7 Drawing Figures

MOTOR-DRIVEN FILM REWIND DEVICE FOR A CAMERA

BACKGROUND OF THE INVENTION

1. Field of the Invention

This invention relates to a motor-driven film rewind device for a camera, and more particularly, to such a device which may lead to simplified construction of a camera using a motor drive system separable therefrom.

2. Description of the Prior Art

None of the conventional cameras known to me and using a motor drive system separable therefrom has incorporated a film rewind device driven from the motor. In some of the conventional cameras using a motor drive system formed integrally therewith, there has been incorporated a rewind device; but in these cameras, the revolution of the motor adjacent to the bottom of the camera body is transmitted to the camera's rewind shaft via a transmission mechanism and the rewind operation has been effected at the upper portion of a magazine. This has made it necessary that a gear for rotating the camera's rewind shaft be provided within the camera, and that a connecting shaft or like member be provided to transmit the motor drive from the bottom to the top of the camera. The provision of such a member in a camera of the type using a separable motor drive system would complicate the construction of the camera and thus fail to provide a light-weight and compact camera.

SUMMARY OF THE INVENTION

I have conceived apparatus of the class described which avoids the above-noted disadvantages by providing an opening in the bottom wall of a film magazine receiving chamber of the camera so that the rewind shaft of the motor drive system may pass through such opening for engagement with the lower portion of a magazine spool thereby to accomplish a film rewinding operation.

Thus, the present invention provides a motor-driven film rewind device for a camera which comprises a camera body adapted to receive a film supply spool, and a motor drive system for attachment to the bottom of the camera body. The motor drive system may include a motor, a circuit for driving the motor including a switch for opening and closing the circuit, and a rotary shaft slidable axially thereof between first and second positions. The rotary shaft has, at one end thereof, coupling means engageable with the supply spool when the motor drive system is attached to the bottom of the camera body and the rotary shaft is in its second position. The switch in the circuit is responsive to the sliding movement of the rotary shaft and is opened and closed in the first and second positions of the rotary shaft, respectively.

The coupling means may comprise a pair of opposed pawls pivotally mounted at one end of the rotary shaft, and a spring for biasing the pawls away from each other. The motor drive system may further include a member for preventing the pawls of the coupling means from being pivotally moved away from each other by the spring when the rotary shaft is in its first position. Thus, the coupling means allows the pawls to be pivotally moved away from each other into engagement with the supply spool by the spring when the rotary shaft is in its second position, thereby transmitting the rotation of the rotary shaft to the supply spool.

The motor drive system may further include an exteriorly operable member connected to the rotary shaft for sliding the rotary shaft axially thereof, a transmission mechanism connected to the rotary shaft to transmit the drive from the motor to the rotary shaft, and clutch means interposed between the rotary shaft and the transmission mechanism to establish connection and disconnection therebetween. The clutch means may connect together the rotary shaft and the transmission mechanism in the first position of the rotary shaft and may disconnect them in the second position of the rotary shaft. Thus, when the rotary shaft is brought into its second position, the supply spool may be rotated by the motor to rewind a film on the spool.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification, wherein.

DESCRIPTION OF THE PREFERRED EMBODIMENTS

Figure 1:
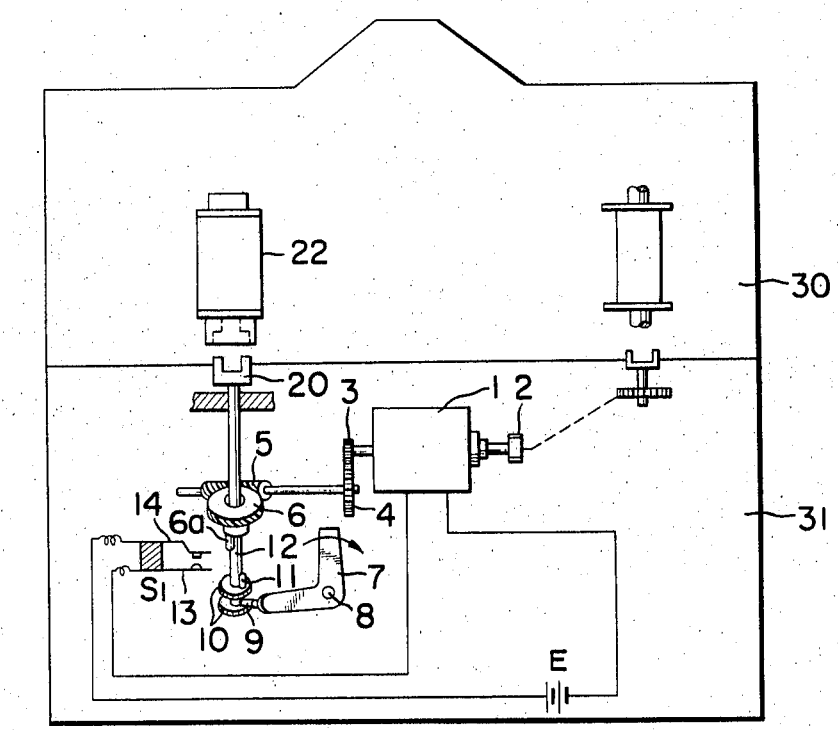
FIG. 1 schematically illustrates the mechanical arrangement and electrical circuitry of the device according to the present invention.

Referring to FIG. 1, a camera body and a housing for accommodating therein a motor drive system are designated by reference numerals 30 and 31, respectively. An electric motor 1, as drive source, has a clutch 2 and a gear 3 attached to the opposite ends of the shaft thereof; and a gear 4 engages the gear 3. The gear 4 and a worm 5 are securely mounted on a common shaft, and the worm 5 is engaged by a worm wheel 6 having a pawl 6a secured to the lower end thereof. A lever 7, operable from outside the camera body, is mounted for rotation about a pivot 8, and has a member 9 secured thereat. The member 9 engages a member 10 having a pawl 11 formed integrally therewith. A shaft 12, secured to the member 10, extends through the center hole in the worm wheel 6 and is axially slidable with respect to the worm wheel. The shaft 12 is provided with a coupling 20 at the upper end thereof (as viewed) for engagement with the spool of a film magazine 22 through an opening (not shown) provided in the bottom of the camera body 30.

Figure 3A:
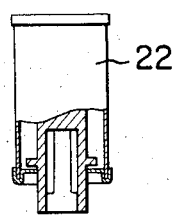
FIGS. 3A, 3B and 3C illustrate the engagement between a film magazine spool having projections formed in the lower portion thereof and a rewind shaft coupling.
Figure 3B:
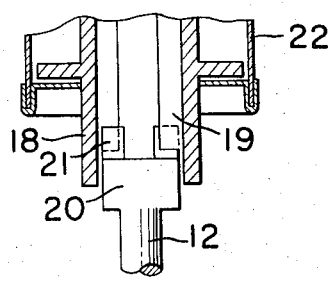
Figure 3C:
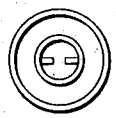
Figure 4A:
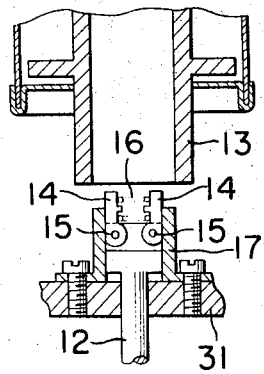
FIGS. 4A and 4B illustrate the engagement between a film magazine spool having no such projection and a rewind shaft coupling.
Figure 4B:
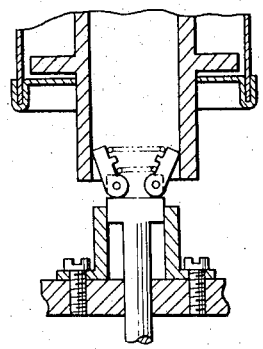

The engagement between such spool and coupling 20 is illustrated in FIGS. 3A, 3B and 3C. As shown there, spool 18 has projections 19 formed in the lower portion thereof. The coupling 20 is formed with pawls 21 which are engageable with the projections 19 in the spool 18, thereby to transmit rotation of the shaft 12 to the spool 18.

Where the magazine in use is of the type having no such projections in the spool thereof, the associated coupling may take the form shown in FIGS. 4A and 4B to transmit the rotation of the shaft 12 to the spool. In this case, pawls 14 are mounted on the shaft 12 and are pivotable about pivots 15. A compression spring 16 is interposed between the pawls 14 so as to impart an outwardly directed force to these pawls. A member 17 is secured to the housing 31 of the motor drive system to prevent the pawls 14 from opening outwardly in the lowered position of the shaft 12.

Referring again to FIG. 1, switch S1 is provided which comprises conductors 13 and 14. The conductor 13 is engageable with the aforesaid member 10 and is adapted to open and close the switch S1 in response to the sliding movement of the member 10 in the axial direction.

Figure 2:
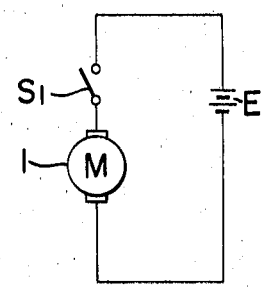
FIG. 2 is a diagram illustarting the electrical circuitry of FIG. 1 in particular.

The rewind operation will now be described with reference to the drawings. In FIG. 1, the lever 7 is manually actuated in direction of arrow to cause the member 9 to raise the member 10, thereby closing the switch S1. Thus, the circuit from the electric source E to the motor 1 is closed to energize the latter (FIG. 2). At this time, no rotational movement is transmitted to the winding means of the camera due to the action of the clutch 2. The revolution of the motor 1 is transmitted via gears 3 and 4 and worm 5 to worm wheel 6. Further rotation of the lever 7 will bring the pawl 11 of the member 10 into engagement with the pawl 6a of the worm wheel 6, so that the rotation of the worm wheel is transmitted to the rewind shaft 12. Where the magazine in use is of the type having the projections formed in the lower portion of the spool thereof, as shown in FIGS. 3A, 3B and 3C, the upward movement of the rewind shaft 12 brings the pawls 21 of the coupling 20 into engagement with the projections 19 in the magazine spool, through the opening (not shown) provided in the bottom of the camera body 30, thus transmitting the rotation of the rewind shaft to the magazine. Where the magazine in use is of the type having no projections formed in the lower portion of the spool thereof, as shown in FIGS. 4A and 4B, the upward movement of the rewind shaft 12 allows the pawls 14 to enter and open outwardly in the spool 13 of the magazine 22 to establish a frictional connection between the rewind shaft 12 and the spool 13. p Thus, according to the present invention, the revolution of the motor 1 may be transmitted to the rewind shaft 12, which may be moved up into an opening formed in the bottom end of the magazine in the camera until engaged with the magazine spool 13, thereby effecting the film rewinding.

This arrangement avoids complication of the camera's interior construction and, accordingly, contributes to a compact and light-weight construction of the camera.

I believe that the construction and operation of my novel film rewind device will now be understood, and that its advantages will be fully appreciated by those persons skilled in the art.

I claim:

1. In a camera adapted to receive a film supply spool, an opening formed in the body of the camera and a motor-driven film rewind device detachably attached to the camera body, said motor-driven film rewind device comprising
    1. a motor;
    2. a circuit for driving said motor including a switch for opening and closing said circuit;
    3. a rotary shaft slidable axially thereof between first and second positions,
    said rotary shaft having, at one end thereof, coupling means engageable with the supply spool through said opening in the camera body when said motor-driven film rewind device is attached to the camera body and said rotary shaft is in its second position,
    said switch being responsive to the sliding movement of the rotary shaft and opened and closed in the first and second positions of the rotary shaft, respectively; and
    4. transmission means connected between the rotary shaft and the motor for transmitting the drive from the motor to the shaft to rotate same, whereby, when the rotary shaft is brought into its second position, the supply spool is rotated by the motor through the transmission means and the rotary shaft to rewind the film on the spool.

2. The motor-driven film rewind device according to claim 1 further comprising
    means interposed between the rotary shaft and the transmission means to establish connection and disconnection therebetween,
    said last-mentioned means connecting the rotary shaft to the transmission means in the second position of the rotary shaft and disconnecting the rotary shaft from the transmission means in the first position of the rotary shaft.

3. A device according to claim 1, wherein said coupling means comprises a pair of opposed pawls pivotally mounted at one end of said rotary shaft and a spring for biasing said pawls away from each other, and wherein said motor-driven film rewind device further comprises a member for preventing said pawls of said coupling means from being pivotally moved away from each other by said spring when said rotary shaft is in its first position, said coupling means allowing said pawls to be pivotally moved away from each other into engagement with said supply spool by said spring when said rotary shaft is in its second position, thereby transmitting the rotation of said rotary shaft to said supply spool.

4. A device according to claim 1, wherein said motor drive system further includes an exteriorly operable member connected to said rotary shaft for sliding said rotary shaft axially thereof.

* * * * *